United States Patent
Thomas

[11] Patent Number: 5,871,123
[45] Date of Patent: Feb. 16, 1999

[54] DEVICE FOR DEPOSITION OF A FLUID MATERIAL, MANIPULATOR THEREFOR, AND PROCEDURE FOR USING SAID DEVICE

[75] Inventor: Dominique Thomas, Le Creusot, France

[73] Assignee: Seva, Saone, France

[21] Appl. No.: 700,515

[22] PCT Filed: Feb. 13, 1995

[86] PCT No.: PCT/FR95/00166

§ 371 Date: Nov. 12, 1996

§ 102(e) Date: Nov. 12, 1996

[87] PCT Pub. No.: WO95/23365

PCT Pub. Date: Aug. 31, 1995

[30] Foreign Application Priority Data

Feb. 25, 1994 [FR] France ................................. 94 02365

[51] Int. Cl.⁶ .................................................. B65D 88/74
[52] U.S. Cl. ...................................... 222/146.5; 222/333
[58] Field of Search .............................. 222/146.5, 318, 222/333

[56] References Cited

U.S. PATENT DOCUMENTS

| | | | |
|---|---|---|---|
| 3,853,410 | 12/1974 | Busoni | 222/146.5 X |
| 4,059,714 | 11/1977 | Scholl et al. | 222/146.5 X |
| 4,154,368 | 5/1979 | Gusmer et al. | 222/146.5 X |
| 4,200,207 | 4/1980 | Akers et al. | 222/318 X |
| 4,371,096 | 2/1983 | Scholl et al. | 222/318 X |
| 4,600,124 | 7/1986 | Price | 222/146.5 X |
| 4,938,388 | 7/1990 | Yeh | 222/146.5 |
| 5,277,333 | 1/1994 | Shimano | 222/14 |
| 5,287,913 | 2/1994 | Dunning et al. | 222/146.5 X |

FOREIGN PATENT DOCUMENTS

| | | |
|---|---|---|
| 363 124 | 4/1990 | European Pat. Off. . |
| 403 280 | 12/1990 | European Pat. Off. . |
| 579 417 | 1/1994 | European Pat. Off. . |
| 1202559 | 1/1960 | France . |
| WO 88/03059 | 5/1988 | WIPO . |

*Primary Examiner*—Kenneth Bomberg
*Attorney, Agent, or Firm*—Sughrue, Mion, Zinn, Macpeak & Seas, PLLC

[57] ABSTRACT

A device including a cavity defined by walls (17) having a feed opening (18) and an outlet (19) for the fluid material (m). The outlet (19) is connected to a nozzle (20). The device is suitable for measuring, controlling and depositing the material (m).

9 Claims, 3 Drawing Sheets

FIG_1

DEVICE FOR DEPOSITION OF A FLUID MATERIAL, MANIPULATOR THEREFOR, AND PROCEDURE FOR USING SAID DEVICE

BACKGROUND OF THE INVENTION

The invention relates to the deposition of a hardenable fluid or viscous material. It concerns, first, a device for measuring and regulating the flow rate of a fluid or viscous material. The device comprises an opening for feeding fluid into a cavity delimited by walls. The cavity contains means for controlling the transport of the material to an outlet orifice in the cavity.

The technique used to regulate the flow rate of a fluid is known (see, for example, French Patents Nos. FR 1 074 689 and FR 1 323 988). These known flow rate-measurement and regulating devices do not permit the deposition of a hardenable fluid material on an object. In addition, these known devices are bulky and heavy, thereby adversely affecting the use or shipment thereof by a human operator or robotic manipulator, and, accordingly, the deposition of the material along a three-dimensional curve incorporating a complex shape.

Furthermore, it is not possible to connect these known devices, for example using flexible tubing, to a mobile deposition nozzle, because the hardenable fluid materials are often expandable and compressible when subjected to pressure.

In this situation, the tube expands due to pressure variations, with the result that the flow rate of the pump no longer corresponds to the flow rate of the nozzle.

The invention is intended to solve these difficulties. To this end, the device according to The invention has an outlet orifice which empties into a deposition nozzle made integral with the walls of a cavity.

To regulate flow rate continuously, the fluid-propulsion mechanism is a gear assembly in which the axis of each pinion is substantially perpendicular to the axis of the outlet orifice of the cavity.

The fluid-propulsion mechanism is actuated by a motor, in particular an electric motor.

Flow rate is proportional to the rotation of the gears, and thus, to the rotation of the electric motor, the controlled rotation of which allows measurement of the flow rate.

To obtain a pressure differential approaching zero, i.e., a high degree of adjustment precision without internal material leakage, the device incorporates two pressure bleeds, one of which is up-line, and the other down-line, from the cavity.

Reduction of this internal leakage increases volumetric efficiency and prevents overheating that could adversely affect the material.

In order to keep viscosity within a narrow range and to handle the material, the cavity walls generate heat, for example using cartridges housed in holes, and a heating plate is added to the device, or else a nozzle-, motor-, and/or manipulator-positioning heating element is attached to the device according to the invention.

The nozzle comprises an extrusion orifice incorporating, at the end thereof, an adjustable opening/closing valve, thereby making it possible to obtain a "zero" cavity, that is, a cavity without material in contact with the outside, which could otherwise harden and clog the nozzle.

The invention also concerns a manipulator, in particular a robot of the type incorporating a mobile body on which is mounted a jointed arm having, at its end, a revolving wrist attached to a fluid-deposition gun, the gun comprising an opening for fluid-feed to a cavity delimited by at least one wall, the cavity housing gears for fluid propulsion to an outlet orifice, in which the gun corresponds to the aforementioned device.

The invention further relates to a procedure for deposition of a hardenable fluid or viscous material, deposition occurring by means of the flow of the material into a nozzle, wherein the material is heated, then the flow rate of the material is measured and adjusted, thereby allowing variation of the outlet flow rate of the material during a single deposition operation. Accordingly, if the manipulator slows, it is possible to adjust the flow rate in order to preserve the same linear weight of the deposited product.

BRIEF DESCRIPTION OF THE FIGURES

One embodiment of the invention will now be described with reference to the attached drawings, in which.

DETAILED DESCRIPTION OF THE PREFERRED EMBODIMENT

Figure 1:
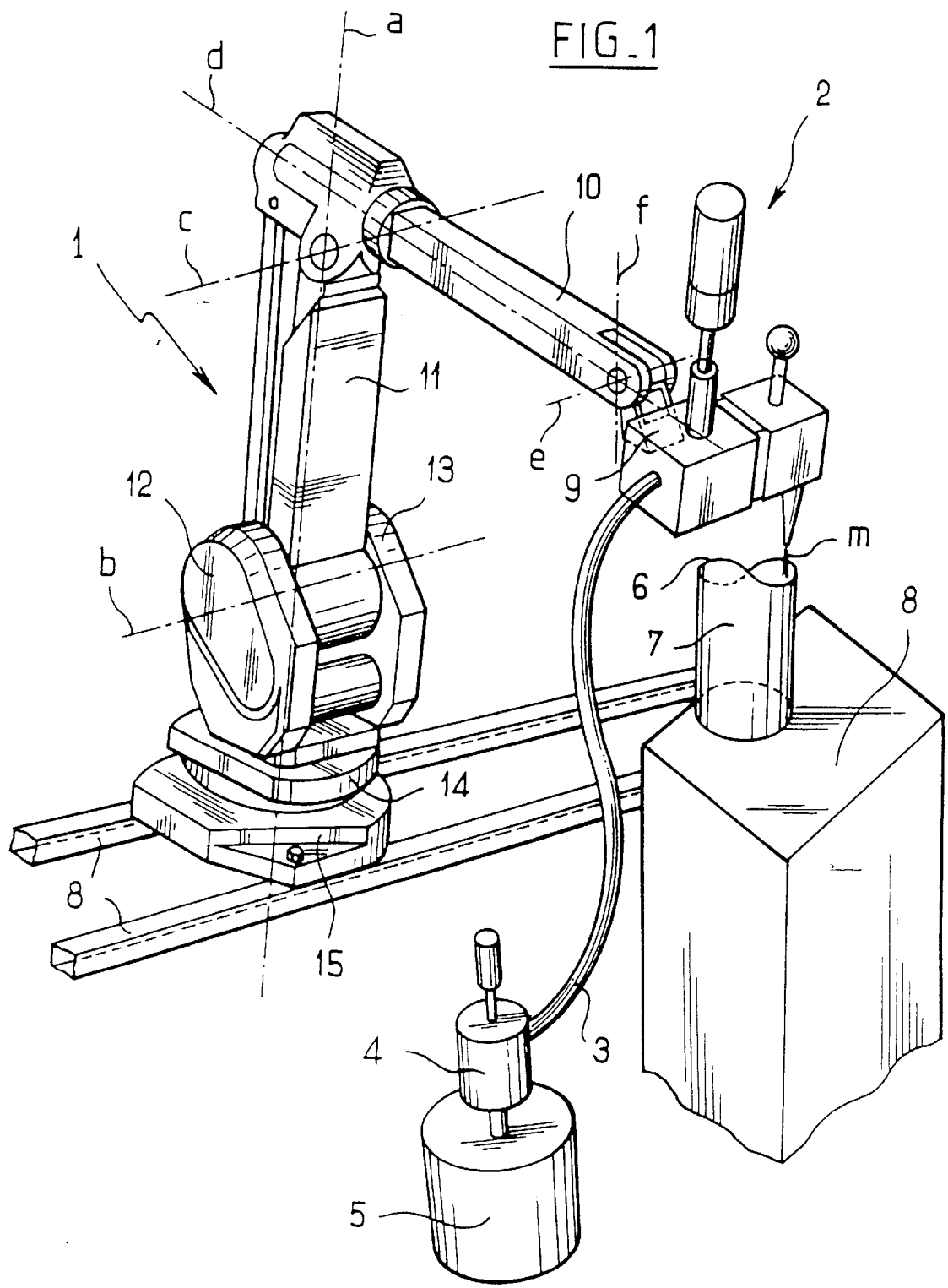
FIG. 1 is a schematic, perspective view of a material-deposition apparatus comprising a device and a manipulator according to the invention.
Figure 2:
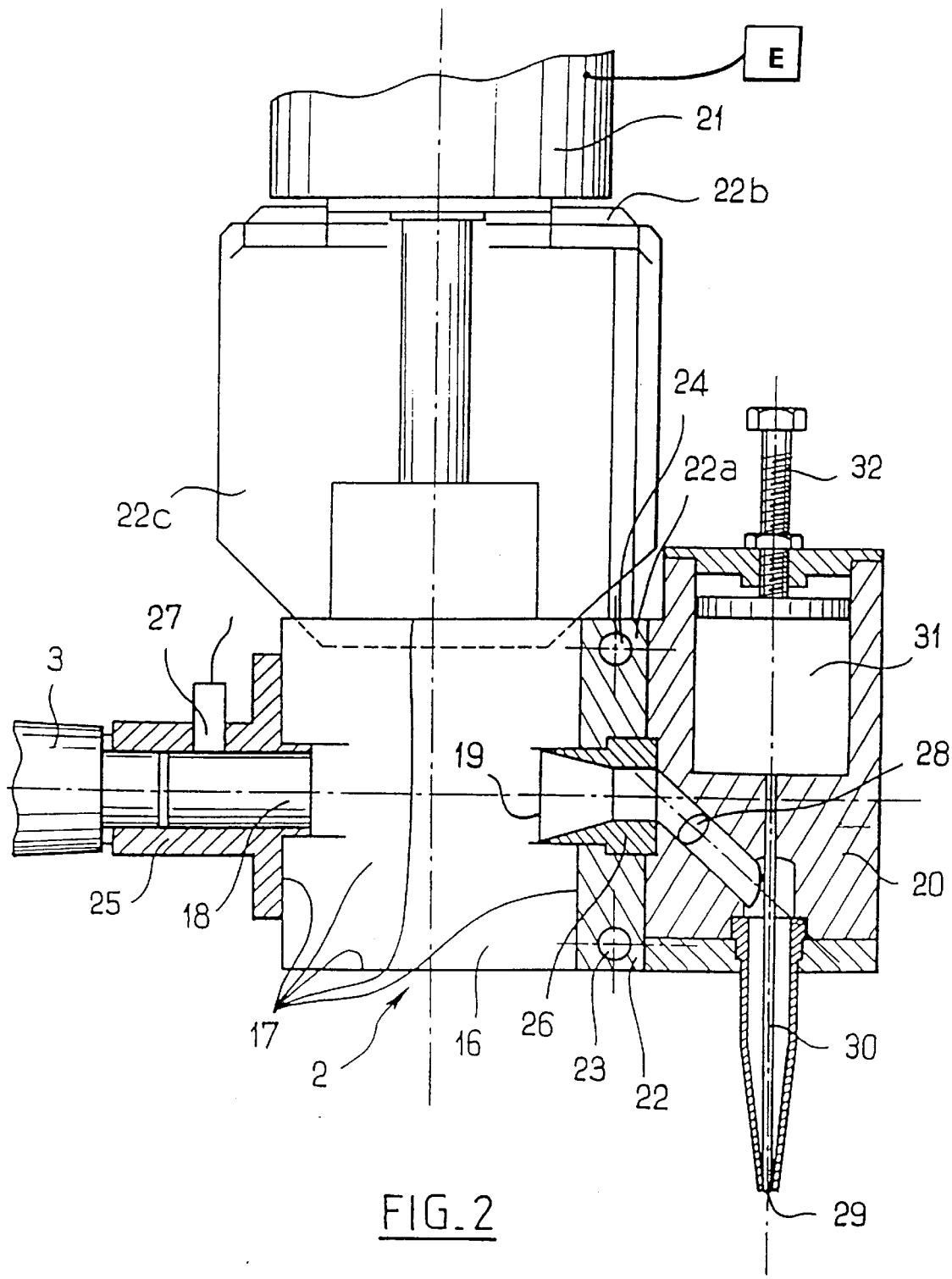
FIG. 2 is a view in cross-section of the device used in this apparatus.

The apparatus in FIG. 1 comprises a robot 1 operating a deposition gun 2.

The gun 2 is fed with a foaming material m through a flexible tube 3 by means of a piston pump 4 positioned on a drum 5 serving as a tank for the material.

The gun 2 deposits the material m on the upper periphery 6 of a cylindrical object 7 attached to a table 8.

The robot 1 moves on slide-rails 8.

The robot 1 is fitted with a wrist 9 for immobilization of the gun 2, the said wrist 9 forming the end of an arm 10 mounted on the body 11 of the robot 1. The body 11 is, in turn, mounted on blanks 12, 13 attached to a support 14 which revolves in relation to a base 15.

The robot comprises six joints having axes a, b, c, d, e, and f positioned, respectively, at the junction of the base 15 with the support 14, of the blanks 12, 13 with the body 11, of the body 11 with the arm 10, on the arm, at the junction of the arm 10 and the wrist 9, and on the wrist 9. The combination of these six joints having axes a, b, c, d, e, and f allows the gun 2 to occupy any position in space.

The gun 2 has a housing 16 delimited by six plane walls 17. One wall incorporates a feed opening 18; the wall opposite incorporates an outlet orifice 19 emptying into a nozzle 20. An electric motor 21 controlled by an electronic variable-speed drive unit E is attached to a third wall 17.

The nozzle 20 and the motor 21 are positioned on the housing 16 by means of a heating support element 22 composed of three plates 22a, 22b, and 22c arranged perpendicularly in space. The plates are heated using two thermoregulated cartridges 23, 24. The tube 3 for feeding the foaming material m is fastened to the feed opening 18 by a collar 25. A duct 26 connects the outlet orifice 19 to the nozzle 20 through the heating plate 22a. Two pressure bleeds 27, 28 are mounted, respectively, on the collar 25 and the outlet of the duct 26 in the nozzle 20. The nozzle 20 comprises a hollow, conical extrusion orifice 29 that can be sealed by a rod 30 forming a valve and made integral with a pneumatic operating jack 31. A screw 32 located at the end of the jack 31 opposite the valve controls the opening of the valve.

Figure 3:
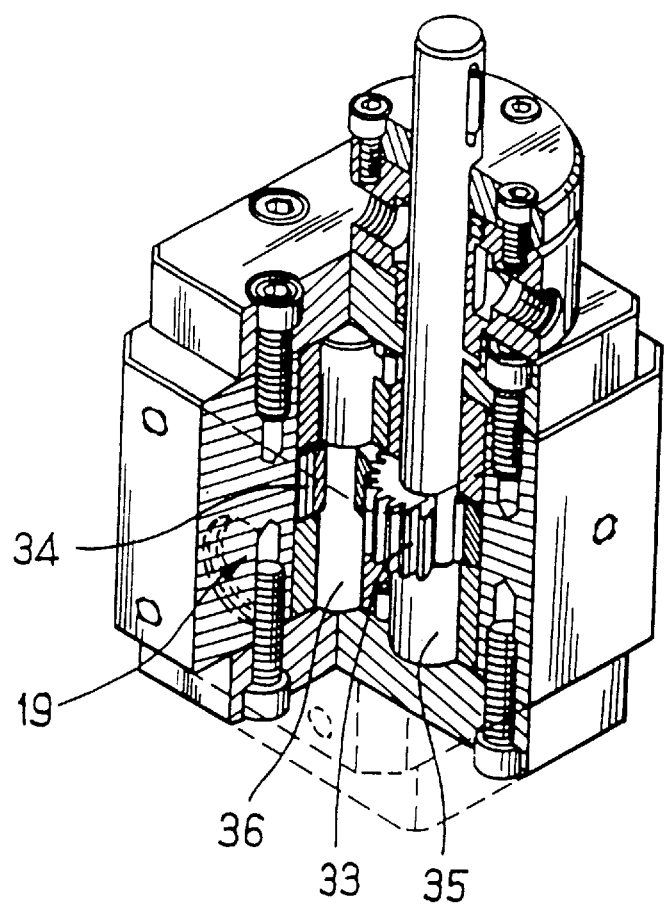
FIG. 3 is a raised, partially torn-away view of the cavity of the device.

The housing 16 contains a gear assembly or mechanism composed of two pinions 33 and 34, as shown in FIG. 3. The pinion 33 is driven by a shaft 35 transmitting the movement of the motor 21. The second pinion 34 is mounted on a shaft 36. The parallel shafts 35 and 36 are mounted perpendicularly to the outlet orifice 19.

The apparatus works in the following way. The foaming material m is pumped from the tank 5 by the pump 4, which feeds the mobile gun 2 through the flexible tube 3.

The robot 1 positions and shifts the extrusion orifice 2 integral with the gun 29. The flexibility of the tube 3 allows the gun to be fed at variable distances from the tank 5.

The product is transported to the outlet orifice 19 by the rotation of the pinions 33, 34. The pinion 34 is driven by the pinion 33, whose rotation is controlled by the motor; in this way, the motor controls the flow rate. The robot gives the command to start the motor and open the nozzle when it has brought the gun 2 into the working position. At this moment, the foaming material flows at a regulated flow rate, thereby making it possible to produce the repeated deposition of a ribbon of foaming material. Deposition takes place by virtue of the fact that the robot 1 moves the nozzle 20 above the area to be covered. The cycle ends when the nozzle is closed and, simultaneously, the robot stops the motor. The robot then brings the gun 2 back into its stand-by position.

The use of an electric motor 21 equipped with its variable-speed drive unit E allows variation of the flow rate of the foaming material m during a deposition cycle.

The invention is not limited to the embodiment described. As a variant, the manipulator may be a motorized slide-rail.

I claim:

1. A device for measuring and regulating the flow rate of a viscous fluid material (m), said device comprising:

a) gun equipped with a cavity delimited by at least one wall (17), said cavity incorporating a fluid-feed opening (18) and an outlet orifice (19) emptying into a deposition nozzle (20) integral with said at least one wall, and
   b) a mechanism for transporting the material to the nozzle,
   c) wherein the mechanism for transporting the material is capable of regulating the flow rate of the material and is a gear mechanism disposed in said cavity.

2. A device according to claim 1, wherein the gear mechanism comprises pinions (33, 34) having axes substantially perpendicular to an axis of the outlet orifice of the cavity.

3. A device according to claim 1, wherein the gear mechanism is driven by an electric motor (21).

4. A device according to claim 1, further comprising two pressure bleeds (27, 28) disposed upstream and downstream from the cavity.

5. A device according to claim 1, wherein the at least one wall of the cavity produces heat using cartridges (23, 24) housed in holes.

6. A device according to claim 1, further comprising a heating plate (22a) disposed on the gun.

7. A device according to claim 3, further comprising a heating element (22) attached to one of the nozzle and the motor.

8. A device according to claim 1, wherein the nozzle comprises an extrusion orifice incorporating, at an end thereof (29), an adjustable closing/opening valve (30).

9. A robot manipulator, comprising, a) a mobile body (11),
   b) a jointed arm (10) mounted on said body, and incorporating, at an end thereof, a revolving wrist (9), and
   c) a device for measuring and regulating the flow rate of a viscous fluid material, as defined in claim 1, attached to said wrist.

* * * * *